Dec. 23, 1969  R. H. TOUBHANS  3,484,942
MICROMETER WITH NON-BACKLASH, NON-ROTATING LEAD SCREW
Filed Feb. 15, 1968  2 Sheets-Sheet 1
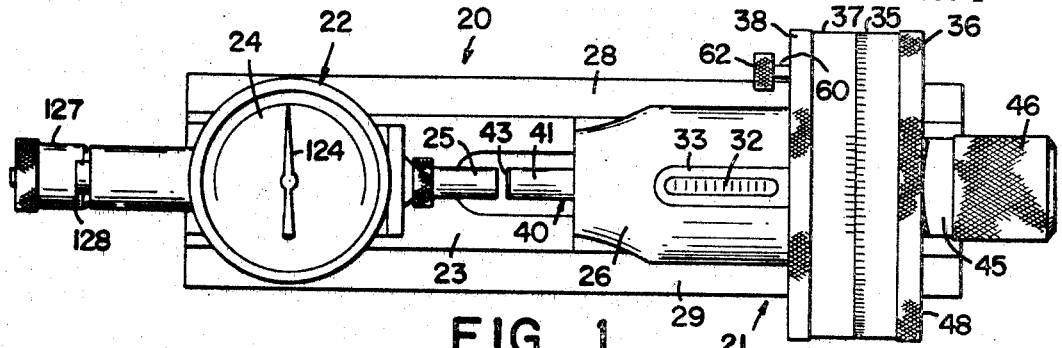
FIG_1
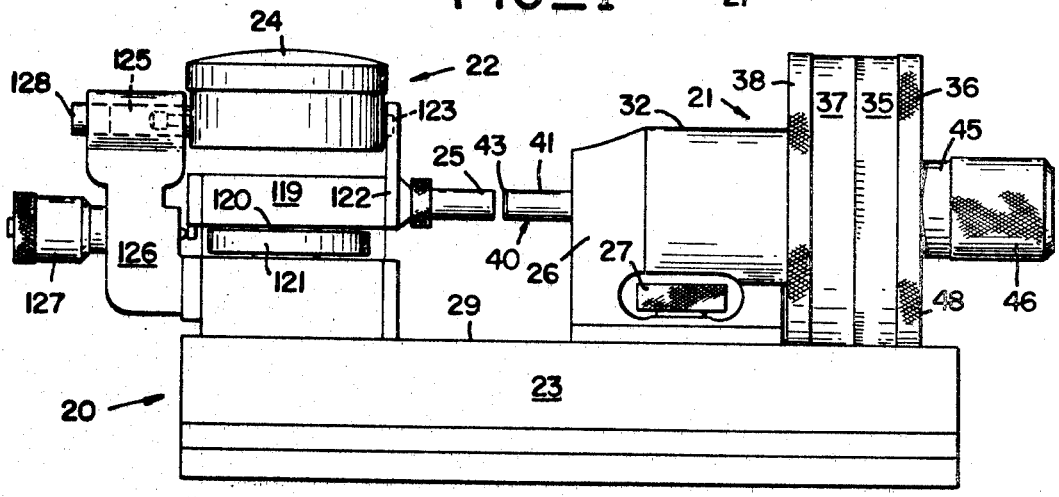
FIG_2
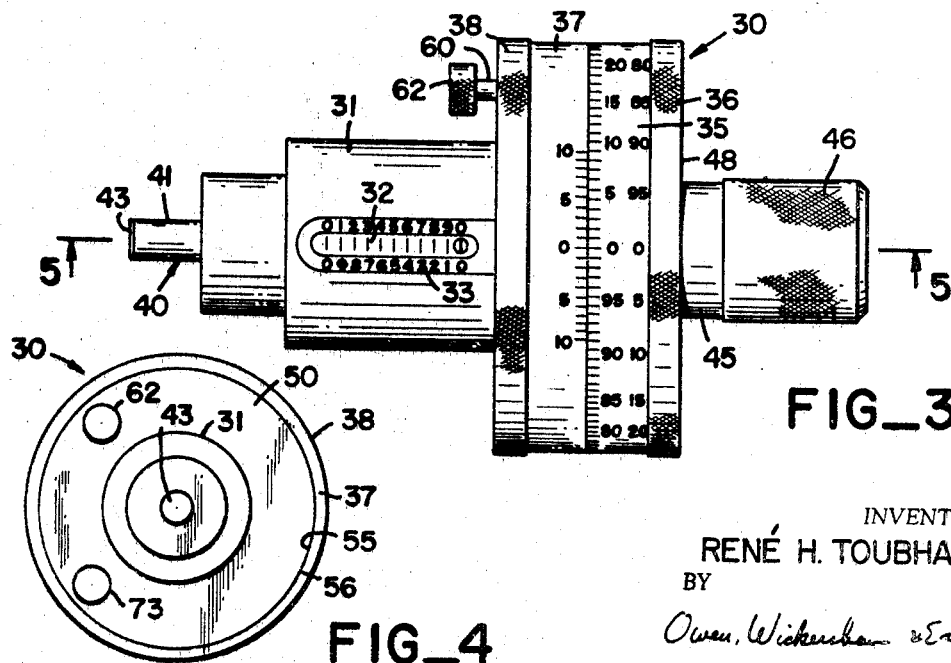
FIG_3
FIG_4
INVENTOR.
RENÉ H. TOUBHANS
BY
Owen, Wickersham & Erickson
ATTORNEYS

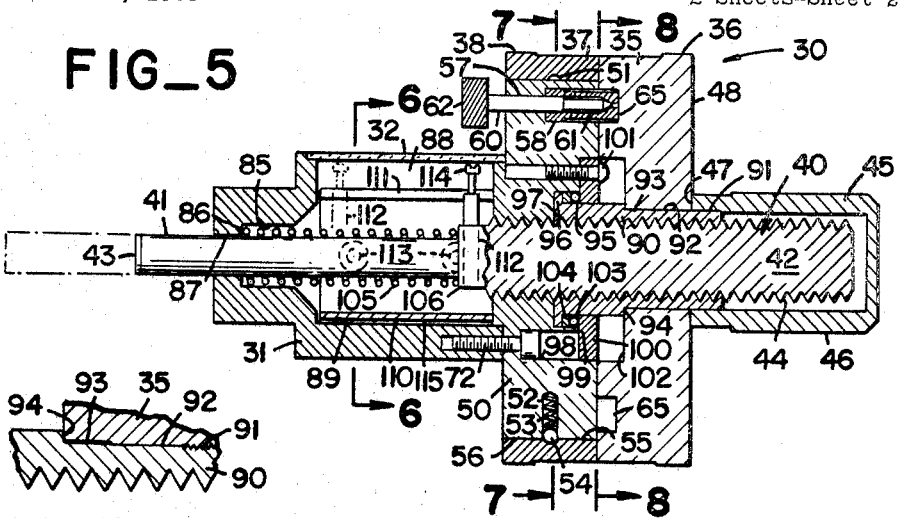
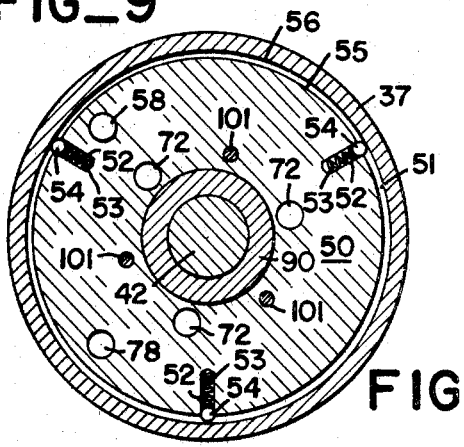
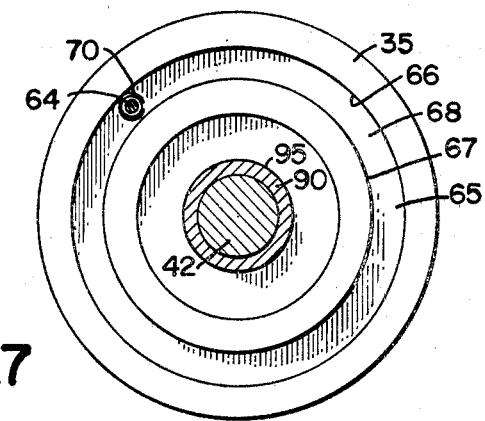
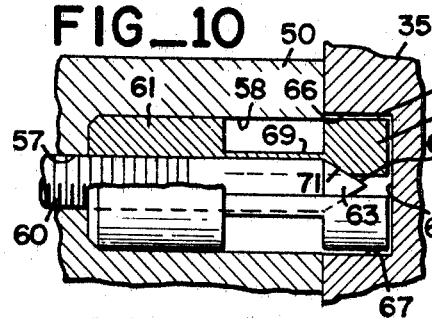
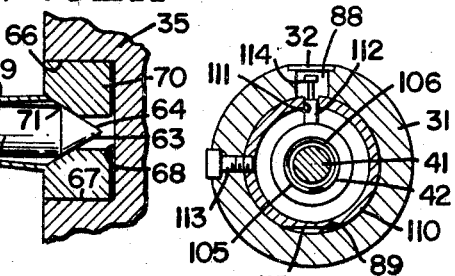
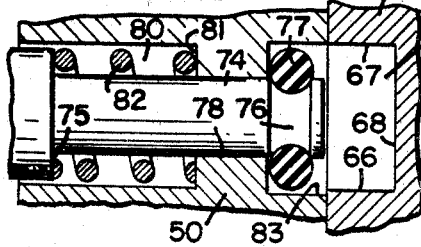

United States Patent Office 3,484,942
Patented Dec. 23, 1969

3,484,942
MICROMETER WITH NON-BACKLASH, NON-ROTATING LEAD SCREW
René H. Toubhans, 4515 E. Fairmount Ave., Tucson, Ariz. 85716
Filed Feb. 15, 1968, Ser. No. 705,650
Int. Cl. G01b 3/18, 5/00
U.S. Cl. 33—166                                21 Claims

ABSTRACT OF THE DISCLOSURE

A micrometer having a lead screw with a rear threaded portion, a forward portion terminating in an anvil tip, and a locating pin with an indicator extending out radially therefrom. A springy sleeve secured in the support means provides an axial guide slot through which the locating pin extends, so that the indicator moves beneath the window to indicate each complete revolution of the bushing. The support means also has a body supporting a slip ring with both a zero indicator line and a vernier thereon. An expansion nut provides a lock for the dial without affecting the measurement, and a fine-adjustment device employs a retractable shaft with an O-ring engaging an annular groove in the dial means.

---

This invention relates to an improved micrometer.

Since micrometers are used to measure very small thicknesses, critical errors can be caused by things which, in other environments, would not matter and would be called negligible. For example, the turning of the micrometer spindle as it closes in on a thin workpiece being measured has tended to bring about both inaccuracy in the measurement and possible damage to the workpiece. Accordingly, one object of the present invention is to provide a micrometer in which the rotating spindle is replaced by a measuring member which does not turn but moves only in translation.

Another source of errors in micrometers has been backlash. Even if backlash is not present in a brand new micrometer, it may be developed as the threads become worn. Any play in the threads of the micrometer measuring member introduces just that much tolerance of error. Therefore, it is an object of this invention to eliminate errors due to backlash in the measuring member of the micrometer.

Another source of errors in micrometers has been in their reading by the operator. If the calibrations are difficult to see or if they compel the reader to calculate (as when they read in quarters of an inch for each turn and require addition of quarters or when the larger units must be calculated), the accuracy of the instrument itself is confounded by the tendency to misinterpret or misread its indication. Hence, another object of the invention is to provide a micrometer which is read easily and offers its information in a logical fashion. For example, a typical instrument of this invention has one scale reading in tenths of an inch and another scale covering one-tenth of an inch and calibrated in thousandths of an inch. A vernier is also provided to enable direct readings in ten-thousandths of an inch. The micrometer itself is so accurate that attachment of an electronic reading device enables measurement of millionths of an inch.

Micrometers are often used in conjunction with a headstock member as comparators, such as the micrometer-comparator shown in my U.S. Patent No. 2,863,221, to compare parts which are intended to be identical. For this purpose, the present invention provides an improved locking system by which the micrometer's measuring member is quickly secured in place. An important feature is that this locking does not result in any motion of the measuring member itself.

A number of other constructional features of significant interest make it easy and practical to assemble and disassemble the micrometer and to get all the parts properly aligned. These features will be dealt with in the detailed description below.

Another important feature of the invention is its adaptability. It can be used on many types of equipment and can be made in several forms with only minor changes in some of the parts. For example, it can be used on micrometer-comparators, shadow-comparators, toolmaker's microscopes, optical instruments, and direct micrometers.

To summarize some of the features of the invention, my new micrometer has a non-rotating lead screw in place of the usual spindle and has a bearing and spring structure which prevents backlash from developing with wear. Improved reading is provided, as well as a device which enables very slow and delicate movement of the lead screw. A new system of direct reading helps to eliminate mistakes. Various features enable assembly and adjustment to be done easily and accurately. Some improvements in the comparator portion of a micrometer-comparator are also provided.

Other objects and advantages of the invention will appear in the following description of a preferred form thereof.

In the drawings:

FIG. 1 is a top plan view of a micrometer-comparator embodying the principles of the invention.

FIG. 2 is a view in side elevation of the micrometer-comparator of FIG. 1.

FIG. 3 is a top plan view, in an enlarged scale as compared with FIG. 1, of a modified form of micrometer basically similar to that used in FIGS. 1 and 2 but having a different adapter member.

FIG. 4 is a view in end elevation looking at FIG. 3 from the left, shown on a reduced scale.

FIG. 5 is a view in vertical section of the micrometer of FIG. 3 taken along the line 5—5 in FIG. 3. Extended positions of the lead screw and indicator pin are shown in broken lines.

FIG. 6 is a view in section taken along the line 6—6 in FIG. 5.

FIG. 7 is a view in section taken along the line 7—7 in FIG. 5.

FIG. 8 is a view in section taken along the line 8—8 in FIG. 5.

FIG. 9 is an enlarged fragmentary view of a portion of FIG. 5, relating to assembly of the lead screw nut and the micrometer dial.

FIG. 10 is an enlarged fragmentary view in section of the lead-screw locking mechanism of the device of FIG. 5 in its unlocking position.

FIG. 11 is a fragmentary view in section of a portion of FIG. 10 showing the locking mechanism moved to its locking position.

FIG. 12 is an enlarged fragmentary view in elevation and in section of part of the fine-adjustment device in retracted position.

FIG. 13 is a fragmentary view of a portion of FIG. 12 showing the fine-adjustment device in its operative position, achieved when its knob is pushed in.

FIGS. 1 and 2 show a micrometer-comparator 20 somewhat similar to that shown in my micrometer-comparator shown in my U.S. Patent No. 2,863,221 which issued Dec. 9, 1958. The present invention has some changes in both its micrometer subassembly 21 and in its comparator subassembly 22. These assemblies are mounted opposite each other on a base 23, the comparator subassembly 22 being a headstock and the micrometer subassembly 21 a tailstock. The comparator subassembly 22 includes a dial 24 and an anvil 25 against which an object whose thickness is to be measured is placed. The micrometer subassembly 21 is provided with a supporting adapter 26 having a tailstock lockscrew 27 that can be tightened to hold the subassembly 21 in place at any lengthwise position or can be loosened to enable sliding movement on a pair of rails 28 and 29.

FIG. 3 shows a micrometer 30, which is the same as the micrometer subassembly 21 except that its adapter 31 is cylindrical. This enables its use in many other environments. Since the micrometers 21 and 30 are otherwise the same, their identical parts are identified by the same reference numerals; description will be based mainly on the micrometer 30, as shown in FIGS. 3 to 13. The adapters 26 and 31 are alike provided with a transparent window 32, preferably plastic, having a calibrated series of markings, and on its margin 33 numbers are arranged from zero to ten in both directions. This window 32 is used for the measurement of tenths of an inch, in a manner explained later.

Measurements in terms of thousandths of an inch are given directly by a calibrated micrometer dial 35 having a knurled margin 36 to enable turning relative to a slip ring 37 which carries both the zero reference and a vernier scale, preferably reading in both directions (see FIG. 3), as does the dial 35 also. The slip ring 37 also has a knurled margin 38, to enable turning for setting of the zero point.

Turning of the dial 35 advances and retracts a lead screw 40 which has a forward cylindrical portion 41 and a larger-diameter rear threaded portion 42 (FIG. 5). The forward portion 40 has a hardened tip 43 providing the tailstock anvil. The rear portion 42 has threads 44 which, for measurement in terms of inches, preferably has a pitch of exactly one-tenth of an inch. For metric systems the pitch may be one millimeter. The lead screw 40 may also be advanced and withdrawn by turning a cover 45 having a knurled outer surface 46; the cover 45 has an annular end wall 47 that bears non-rotatively against the end wall 48 of the dial 35, and so the cover 45 and the dial 35 rotate together.

Between the adapter 30 and the dial 35 is a body 50, on which the slip ring 37 is mounted. For this purpose, the slip ring 37 is preferably provided with an annular groove 51 semi-circular in cross section, and the body 50 is provided with three equally spaced apart radial holes 52, each carrying a spring 53 urging a ball 54 outwardly into the groove 51 and exactly filling it. This enables the slip ring 37 to be snapped on and off of the body 50 and to be rotated thereon and held firmly to any circumferential position to which it is set, the bore 55 of the slip ring 37 being a snug fit on the outer periphery 56 of the body 50.

The body 50 (see FIGS. 10 and 11) is provided with an opening 57 leading into a larger opening 58. The opening 57 receives a smooth shank of a locking screw 60, while the opening 58 holds most of an expansion nut 61 into which the locking screw 60 is threaded when its knurled head 62 is turned. The screw 60 has a forward nose 63 having a sharply beveled end 64. The opening 58 faces an annular groove 65 in the dial 35, which is rectangular in cross section, having side walls 66 and 67 and an end wall 68. The nut 61 is split at a thin flexing springy portion 69 and at its outer end 70, which extends into the groove 65 but is spaced away from the end wall 68 and is normally not in engagement with the walls 66 and 67. The split outer end portion 70 has an interior beveled seat 71, and when the screw 60 is turned to move it in, the beveled surface 64 engages the seat 71 and forces this end portion 70 apart, applying a spreading action, that pushes the portion 70 into contact with the side walls 66 and 67 (see FIG. 11). The nut portion 70 bears *only* against the side surfaces 66 and 67, locking the body 50 (which is secured to the adapter 30 by screws 72) to the dial 35 (and therefore, as will be seen, to the lead screw 40), but not engaging the wall 68 and hence not producing any fore-and-aft movement of the dial 35 or the lead screw 40, as would be produced if the locking screw 60 were made to bear directly on the wall 68.

The groove 65 is also used in cooperation with a fine-adjustment advancing wheel 73 which is on a shaft 74 having a shoulder 75 (see FIGS. 12 and 13) and having a groove 76 near its outer end in which an O-ring 77 is located. The shaft 74 extends through an opening 78 in the body 50, and the opening 78 is aligned with the groove 65. Ahead of the opening 78 is a recess 80 having a wall 81 against which a spring 82 bears. The spring 82 also bears against the shoulder 75 and normally urges the shaft 74 outwardly, so that the O-ring 77 is normally retracted from the groove 65 into a recess 83 in the body 50. However, when the wheel 73 is pressed forward, the O-ring 77 is pushed into the groove 65 into contact with one wall 66 only, so that when the wheel 73 is then turned, the O-ring 77 turns the dial 35; this turning is in slow-motion, relative to the more rapid turning of the dial 35 by the knurled portion 36 or by the handle 45.

The adapter 31 (like the adapter 26) is hollow, having a cyclindrical passage 85 (FIG. 5) with an end wall 86, from which an opening 87 leads through to the exterior and through which the lead screw portion 41 extends. Beneath the window 32 a slot 88 leads down into a larger cylindrical recess 89, the purpose of which will be explained later.

To the rear of the recess 89, the adjusting screw threads 44 are threaded into a lead screw nut or bushing 90. There is an exact fitting of the threads. The exterior surface of the lead screw nut 90 is provided with an exteriorly threaded portion 91 (see FIGS. 5 and 9), succeeded by a smooth cylindrical portion 92 that leads to a knurled portion 93 only slightly larger in diameter than the portion 92 and followed by a shoulder 94. A larger cylindrical portion 95 (FIG. 5) goes from the shoulder 94 to an end flange 96, which lies adjacent a wall 97 of the body 50, in a recess 98. The micrometer dial 35 bears against the shoulder 94 and is held tightly in place by the knurls 93. The cover 45 is threaded onto the portion 91 of the bushing 90 and is tightened against the dial 35 to force it against the shoulder 94. The recess 98 is stepped and has a radial wall 99, against which a thrust washer 100 is fastened by screws 101, the dial 35 having a recess 102 to give them room. Between the thrust washer 100 and the flange 96 are a ball bearing 103 and a small thrust plate 104. Thus the body 50, adapter 30, and thrust washer 100 are stationary, while the bushing 90, dial 35, cover 45, and thrust plate 104 rotate, and the lead screw 40 moves back and forth by translation, but (as will soon be shown) does not rotate.

The backlash effect is prevented by a spring 105 (FIG. 5) around the lead screw portion 41 between a shoulder 106, connecting the portions 41 and 42, and the wall 86 in the adapter 30. This spring 105 keeps urging the lead screw 40 back. Even if backlash should develop, the spring 105 would still be constantly urging the lead screw 40 back, so that the development of clearance would not affect measurements, for the spring preload automatically compensates for wear on the lead screw threads 44. The spring preload also eliminates radial play on the non-rotating lead screw 40.

The non-rotating fore-and-aft movement of the lead screw 40 is provided with the aid of a split sleeve member 110 in the recess 89 in the adapter 30. The member 110 (see FIGS. 5 and 6) may be a cylindrical sleeve having an axial split 111 therethrough which is slightly narrower than a locating pin 112 that is secured to the lead screw 40 and extends diametrically through it. The sleeve 110 is held in the adapter 30 by screws 113 on one side only of the split 111. The locating pin 112 is provided with a socket which receives a pointer or marking member 114 that carries a transverse line and serves as the indicator for reading against the transparent dial 32.

Preferably the bottom 115 of the sleeve 110 is thinned, as by flattening, to make the sleeve 110 more flexible and to reduce the friction, so that the springy sleeve 110 does not hold the locating pin 112 too tightly, but does resolve the rotating movement of the bushing 90 into pure fore-and-aft translation of the lead screw 40, completely without rotation.

A significant feature of the invention is that the sleeve 110 can have a thin shim placed at one end thereof beneath the flattened portion or elsewhere, in order to assure perfect alignment of the lead screw 40 with the passage 87. Shim thicknesses up to 0.001" give ample adjustment to correct any error in any lead screw that is otherwise suitable.

As stated earlier, the use of the lead screw 40 with the pitch of the threads 44 exactly one-tenth of an inch is important (for measuring systems based on decimal fractions of an inch). Micrometers of this type have heretofore relied on pitches necessitating calculation, such as adding a series of 25's for a pitch of ¼". The micrometer 30 reads directly without calculation. The zero device (adjustment of the slip ring) is also important due to its simplicity and complete ease of working.

In assembly, the locating pin 112 is threaded into the lead screw 40, and the sleeve 110 inserted in the adapter 30, and secured in place by the screws 113. The spring 105 is put around the lead screw portion 41 and against the shoulder 106, and the lead screw 40 is inserted into the sleeve 110 and through the opening 87, care being taken to see that the spring 105 gets into the recess 85, where it will seat against the shoulder 86. Then the indicator pointer 114 is threaded into the locating pin, through the open slot 88; after that the window 32 is secured to the adapter 30 (or 26). The slip ring 37 is snapped onto the body 50 and held there by the three balls 54 engaging the groove 51. Then the body 50 may be attached to the adapter 30 by the screws 72. The bushing 90 is threaded onto the lead screw portion 42 and brought to bear with its flange 96 against the wall 97 of the body 50. The thrust plate 104 and ball bearing 103 are inserted, and the thrust washer 100 is then attached to the body 50 by the screws 101.

The locknut 61 is then put into the recess 58 and the locking screw 60 threaded into it. The fine-adjustment shaft 74 is inserted in the opening 78, with the spring 82 on the shaft 74 so that it will bear against the shoulder 75 and the wall 81. The O-ring 77 is put into the groove 76, in the recess 83. Now the dial 35 is put on around the bushing 90 and forced into place over the knurls 93 and against the shoulder 94. The groove 65 fits around the lock nut portion 70 and is automatically aligned with the O-ring 77. The cover 45 is then put over the end of the lead screw 40 and is threaded around the threads 92 of the bushing 90 until its annular end wall 47 abuts the end wall 48 of the dial 35 quite firmly. Assembly is now complete. Disassembly is carried out in the reverse order.

In use, the lead screw 40 is advanced and retracted by turning either the cover 45 or the dial 35. The zero point is set as desired by turning the slip ring 37, and the reading thereafter is direct—by the window 32 and pointer 114 for each full tenth of an inch and by the dial 35 and the zero point on the slip ring 37 for each thousandth of an inch up to a full one-tenth of an inch. The vernier scale on the slip ring 37 directly abuts the direct scale on the dial 35 and enables readings in ten-thousandths of an inch without any parallax problems. The lead screw tip or anvil 43 moves only forward and back and never turns or introduces any twist. The spring 105 eliminates radial play in the lead screw by forcing it back toward the bushing 90, and it also eliminates fore-and-aft play, if wear develops. The dial 35 can be locked for use with the comparator 22 by moving the screw 60 in, and there is no movement of the dial 35 due to such locking. Fine adjustments are made by pushing in on the wheel 73 and then turning it slowly.

The micrometer-comparator 20 of FIGS. 1 and 2 enables reading variances from a desired dimension. The micrometer 21 is set to a desired dimension and locked there by the locking screw 60. Then the headstock anvil 25 is retracted to enable insertion of a machine part and then brought to bear on it to send variances in 0.0001" amounts, as shown on the dial 24. The comparator 22 is basically as shown in U.S. Patent No. 2,863,221, but there are some differences that are quite significant. The headstock anvil 25 is moved fore and aft by a retractor cam 120, which is turned by a knurled wheel 121, engaging a recess in a body member 119 to which the anvil 25 is rigidly secured, as is a forward support plate 122. The plate 122 has a recess which supports and engages a plunger 123 for the mechanism which serves to rotate a pointer 124 as the plunger 123 is moved forward and back, as when the cam wheel 121 is rotated. A support shaft 125 of the dial 24 extends into an opening in a rear support member 126 and may be hollow to enable attachment of an electronic reading device to the plunger 123 (upon removal of a plug 128) for indicating millionths of an inch, while also supporting the dial 24. A pressure adjusting screw 127 enables varying the pressure by the support 126 on the extension 125, calibrations (not shown) being provided thereon to indicate this factor.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A micrometer, including in combination:
   a lead screw having a rear threaded portion with a pitch that is directly related to a selected unit measurement, and having a forward, smooth, cylindrical portion terminating in an anvil tip, said lead screw having a locating pin with indicating means thereon extending out radially therefrom,
   stationary support means having a hollow interior through and beyond which said lead screw extends, and having a slot leading into said interior, and a window covering said slot, and calibrated in terms of said pitch, said support means providing an axial guide slot through which said locating pin extends, so that said indicating means moves beneath said window and indicates movement of said lead screw, in terms of said pitch, said support means also having distant from said window at its rear end a zero indicator line,
   bushing means snugly threaded around said lead screw and retained for relative rotation in said support means by thrust bearing means preventing said bushing means from moving rearwardly of said support means,
   spring means in said stationary support means for urging said lead screw rearwardly thereof and rearwardly of said bushing means for preventing the development of backlash with respect to said bushing means, and
   dial means non-rotatively secured to said bushing means at the rear of said support means and having a cylindrical outer surface calibrated in one hundred divisions corresponding to hundredths of said pitch and facing said zero indicator line.

2. The micrometer of claim 1 wherein said spring means comprises a helical spring bearing at one end on a wall of said hollow interior and at the other end on a shoulder on said lead screw which divides said forward portion from said rear portion.

3. The micrometer of claim 1 wherein the means providing an axial guide slot comprises a substantially cylindrical sleeve split axially and secured on one side only to the stationary support means, the remainder of said sleeve being free to flex so as to provide said slot with a spring action in grasping the locating pin.

4. The micrometer of claim 3 wherein diametrically opposite said slot said sleeve is thinned by a flattened portion to reduce the rigidity of its springy action.

5. The micrometer of claim 1 wherein said dial means has a forward end wall having an annular groove of rectangular cross section and said support means has an opening aligned with the groove and an expansion nut extending into said groove but normally not in contact with the walls of the groove, and a locking screw threaded into said nut for expanding it to lock it against the sides of said groove without forcing it against the end wall of the groove.

6. The micrometer of claim 5 wherein said locking screw has a forward conical end and said expansion nut has a series of axial notches extending in from its locking end through a thinned portion and enabling flexing, and a conical seat for said screw end.

7. The micrometer of claim 1 wherein said dial means has a forward end wall having an annular groove of rectangular cross section, said support means having an opening opposite said groove and a recess around the end of said opening closest to said groove, and a rotatable shaft in said opening having an O-ring mounted on its end near the groove, and spring means for normally retracting said shaft so that the O-ring is retracted from said groove into said recess in said support means, said shaft being pushable against the pressure of said spring means to put said O-ring into said groove and to engage one side wall of said groove, so that when said shaft is then turned, said dial means is turned to advance said lead screw slowly.

8. The micrometer of claim 1 wherein part of said support means is a cylindrical body having on its periphery three radial recesses with a spring and a ball in each, and a slip ring having a round-cross-section groove on its inner periphery around said body periphery, the balls being pushed into said groove by said springs, thereby retaining said slip ring for easy assembly and disassembly relative to said body, said slip ring carrying said zero indicator line, whereby the zero point is readily adjustable by rotation of said slip ring relative to said body.

9. The micrometer of claim 8 wherein said slip ring carries a vernier scale thereon, enabling reading in terms of thousandths of said pitch.

10. The micrometer of claim 9 wherein said window, said dial and said vernier are all calibrated in terms of both directions of said lead screw for direct reading on one of two serial series of numbers on each.

11. The micrometer of claim 1 wherein said dial means comprises an annular member and said bushing means has a shoulder with exterior knurls on a cylindrical portion near said shoulder and an exteriorly threaded portion away from said shoulder, said annular member being held non-rotatively by said knurls and against said shoulder, and a cover around said lead screw and spaced therefrom engaging the exteriorly threaded portion of said bushing means and forcing said annular member against said shoulder, so that said dial means, bushing means, and cover rotate as one piece.

12. A micrometer, including in combination:
a lead screw having a rear threaded portion with a pitch that is directly related to a selected unit measurement, and having a shoulder leading to a forward, smooth, smaller cylindrical portion terminating in an anvil tip, said lead screw having a locating pin with indicating means thereon extending out radially therefrom,
stationary support means comprising an adapter having a hollow interior with a passage beyond which the forward portion of said lead screw extends, a shoulder at the rear end of said passage, a slot leading into said interior, and a window covering said slot and calibrated in terms of said pitch, a body secured to the rear of said adapter and having a cylindrical outer periphery,
a split sleeve secured to said adapter in said interior and having an axial guide slot through which said locating pin extends to limit movement of said lead screw to fore-and-aft movement so that said indicating means moves beneath said window and indicates the movement of said lead screw,
a slip ring mounted on the outer periphery of said body and having at its rear edge a zero indicator line,
bushing means snugly threaded around said lead screw and retained in said body by low-friction thrust bearing means for preventing said bushing means from moving rearwardly relative to said body,
a helical spring in said stationary support means between said adapter shoulder and said lead screw shoulder urging said lead screw rearwardly of said bushing means for preventing the development of backlash between said lead screw and said bushing means, and
dial means non-rotatively mounted on said bushing means, and having a cylindrical outer surface calibrated in one hundred divisions corresponding to hundredths of said pitch and along a front edge directly facing said zero indicator line.

13. The micrometer of claim 12 wherein said sleeve is generally cylindrical and is held to said adapter on only one side thereof near said split and has a thinned flattened bottom imparting greater springy flexibility for engagement with said locating pin.

14. The micrometer of claim 12 wheren said dial means has a forward end wall provided with an annular groove that is rectangular in cross section with axially extending side walls leading to a radial end wall, said body having an opening aligned with said groove and providing a recess facing said groove, an expansion nut held in said recess by a continuous annular portion that is interiorly threaded and having a slotted thinned flexing portion in said recess leading to a slotted end portion lying in said groove but normally spaced from all the walls thereof, said slotted end portion having an interior conical seat, and a locking screw extending into said opening and threaded into said threaded portion and having a conical end portion adapted to bear against said conical seat, so that when said screw is turned in it, it forces said end portion to engage said side walls of said groove to lock said dial means to said body and thereby prevent movement of said lead screw relative to said body and adapter.

15. The micrometer of claim 14 wherein said body has a second opening aligned with said groove, said second opening having an inner recess and an outer recess, a shaft extending into said opening from outside into said inner recess and having an annular groove near its inner end in said inner recess, an O-ring mounted in the annular groove of said shaft, spring means in said outer recess urging said shaft outwardly and retaining said O-ring in said inner recess away from the groove in said body, whereby by pressing in on said shaft, said O-ring is put into said body groove and into contact with one side wall thereof, so that when the shaft is then turned, the dial is turned slowly to advance said lead screw for fine adjustment thereof.

16. The micrometer of claim 12 wherein said slip ring carries a vernier scale thereon.

17. The micrometer of claim 12 wherein the bushing means has a rear portion that is exteriorly threaded and, forward thereof, a knurled periphery adjacent a shoulder, said dial means being against said shoulder on said knurled periphery, and an end cover around and spaced from said lead screw and threaded on said exteriorly threaded portion of said bushing and locked against said dial means and forcing it against said shoulder.

18. A micrometer, including in combination:
a lead screw having a rear threaded portion with a pitch that is one-tenth of a selected unit measurement, and having a shoulder between said threaded portion and a forward smooth cylindrical portion terminating in an anvil tip, an adapter having a through opening through which said forward portion extends and having a shoulder behind said opening leading to a first cylindrical chamber, behind which is a still wider second cylindrical chamber with a radial slot leading to said second cylindrical chamber, said adapter having a window covering said slot and calibrated in tenths of said unit measurement, a spring around said lead screw between said lead screw shoulder and on said adapter shoulder, a sleeve in said second chamber and surrounding said lead screw and spaced therefrom and having an axial split providing a slot, one side of said sleeve being secured to said adapter and the other side left free to flex, a locating pin secured to said lead screw and extending radially out therefrom and through said slot, said pin being slightly larger than said slot is when said sleeve is in its naturally relaxed state, thereby forcing said sleeve to exert a tight grasping spring action on said locating pin, said pin and said sleeve serving to limit movement of said lead screw to fore-and-aft translation, indicating means secured to said locking pin and cooperating with said calibrated window for indicating movement of said lead screw, a body having a central opening around said threaded portion of said lead screw and abutted against the rear end of said adapter at the rear of said second chamber, and secured to said adapter in fixed relationship thereto, said body having a recess in its rear face around said central opening terminating in a shoulder, said body supporting on its outer periphery a zero indicator, a bushing snugly threaded around said lead screw and having a flange adjacent to said body shoulder and having a first cylindrical portion rearward therefrom leading to a step-down shoulder and a second cylindrical portion rearward therefrom with a knurl adjacent said step-down shoulder, and a threaded portion rearwardly thereof, a thrust washer secured to said body and spaced away from said bushing flange, low-friction bearing means between said thrust washer and said flange, a dial having a central opening fitting very snugly on said knurl with a non-rotative press fit and bearing against said step-down shoulder, said dial having a cylindrical outer surface calibrated in one hundred divisions of said pitch and facing the zero indicator on said body; and a cover threaded onto the rear threaded portion of said bushing around and spaced from said lead screw and firmly abutting said dial member, whereby said lead screw is advanced and retracted by turning either said cover or said dial.

19. The micrometer of claim 18 wherein said dial has a forward end wall provided with an annular groove that is rectangular in cross section with side walls and an end wall, said body having an opening aligned with said groove and providing a recess facing said groove, an expansion nut held in said recess by a continuous annular portion that is interiorly threaded and having a slotted threaded flexing portion in said recess leading to a slotted end portion lying in said groove but normally spaced from all the walls thereof, said slotted end portion having an interior conical seat, and a locking screw extending into said opening and threaded into said threaded portion of said nut and having a conical end portion adapted to bear against said conical seat, so that said screw can be turned to force said end portion to engage said side walls of said groove to lock said dial to said body and thereby prevent movement of said lead screw relative to said body and adapter, said expansion nut at all times being spaced from the end wall of said groove.

20. The micrometer of claim 19 wherein said body has a second opening aligned with said groove and having an inner recess and an outer recess, a shaft extending into said opening from outside into said inner recess and having an annular groove near its inner end normally lying in said inner recess, an O-ring mounted in the annular groove of said shaft, spring means in said outer recess urging said shaft outwardly and retaining said O-ring in said inner recess away from the groove in said body, whereby by pressing in on said shaft, said O-ring is put into said body groove and in contact with one side wall thereof, so that when the shaft is then turned, the dial is turned slowly to advance said lead screw for fine adjustment thereof.

21. The micrometer of claim 18 wherein said body has a cylindrical outer periphery provided with three circumferentially aligned openings in each of which is a spring, a slip ring around said outer periphery and having a circumferential groove therein aligned with said openings, and a ball urged by each said spring into said groove, said slip ring carrying said zero indicator and also a vernier scale facing the calibrations on said dial.

References Cited

UNITED STATES PATENTS

| | | | |
|---|---|---|---|
| 2,939,220 | 6/1960 | Croshier et al. | 33—167 |
| 3,002,284 | 10/1961 | Sunnen. | |
| 3,222,790 | 12/1965 | Meyer | 33—166 |

WILLIAM D. MARTIN, JR., Primary Examiner

U.S. Cl. X.R.

33—147, 164